US012014849B2

(12) United States Patent

Yasuyoshi et al.

(10) Patent No.: US 12,014,849 B2

(45) Date of Patent: Jun. 18, 2024

(54) INSULATED WIRE WITH BONDING LAYER OF POLYOLEFIN AND POLYAMIDE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Yasuyoshi, Mie (JP); Toyoki Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 381 days.

(21) Appl. No.: 17/422,291

(22) PCT Filed: Dec. 26, 2019

(86) PCT No.: PCT/JP2019/051051

§ 371 (c)(1),
(2) Date: Jul. 12, 2021

(87) PCT Pub. No.: WO2020/149134

PCT Pub. Date: Jul. 23, 2020

(65) Prior Publication Data

US 2022/0084721 A1 Mar. 17, 2022

(30) Foreign Application Priority Data

Jan. 16, 2019 (JP) ................................ 2019-004841

(51) Int. Cl.

*H01B 7/40* (2006.01)
*H01B 7/02* (2006.01)
*H01B 13/14* (2006.01)

(52) U.S. Cl.

CPC ............ *H01B 7/40* (2013.01); *H01B 7/0275* (2013.01); *H01B 13/148* (2013.01)

(58) Field of Classification Search

None

See application file for complete search history.

(56) References Cited

U.S. PATENT DOCUMENTS 3,616,191 A * 10/1971 Fuerholzer ............ B32B 27/322 525/61
4,291,085 A * 9/1981 Ito ............................ B32B 7/02 428/458

(Continued)

FOREIGN PATENT DOCUMENTS

BR 0318419 A * 8/2006
BR PI0418777 A * 10/2007

(Continued)

OTHER PUBLICATIONS

International Search Report dated Mar. 17, 2020 for WO 2020/149134 A1 (4 pages).

*Primary Examiner* — Timothy J. Dole
*Assistant Examiner* — Muhammed Azam
(74) *Attorney, Agent, or Firm* — Venjuris, P.C.

(57) ABSTRACT

An insulated wire with bonding layer includes: a conductor; an insulating coating layer that covers an outer circumference of the conductor; and a bonding layer that is provided on an outer side of the insulating coating layer and is bonded by heat, wherein the insulating coating layer contains polyvinyl chloride, and the bonding layer contains a modified polyolefin resin and a polyamide resin.

8 Claims, 5 Drawing Sheets

(56) References Cited

U.S. PATENT DOCUMENTS

| | | | | |
|---|---|---|---|---|
| 2003/0008158 | A1* | 1/2003 | Carrus | H01B 7/2825 428/458 |
| 2006/0251802 | A1* | 11/2006 | Kummer | B05D 7/14 427/117 |
| 2010/0252322 | A1* | 10/2010 | Sato | H01B 7/0275 174/72 A |
| 2012/0092016 | A1* | 4/2012 | Kruspe | G01V 3/32 324/333 |
| 2018/0061525 | A1* | 3/2018 | Kohori | H01B 7/295 |
| 2019/0333658 | A1* | 10/2019 | Yamazaki | H01B 13/0036 |
| 2022/0084721 | A1* | 3/2022 | Yasuyoshi | H01B 7/40 |

FOREIGN PATENT DOCUMENTS

| | | | | | |
|---|---|---|---|---|---|
| CN | 1708546 | A | * | 12/2005 | C08L 23/06 |
| CN | 1830041 | A | * | 9/2006 | H01B 3/441 |
| CN | 1891779 | A | * | 1/2007 | |
| CN | 101295557 | A | * | 10/2008 | B32B 27/06 |
| CN | 102947898 | A | * | 2/2013 | H01B 7/40 |
| CN | 104821198 | A | * | 8/2015 | |
| CN | 107078237 | A | * | 8/2017 | B32B 15/06 |
| CN | 115668677 | A | * | 1/2023 | H01B 7/40 |
| EA | 001727 | B1 | * | 8/2001 | |
| EP | 0355792 | A2 | * | 2/1990 | |
| EP | 0382539 | A1 | * | 8/1990 | |
| EP | 0483954 | A1 | * | 5/1992 | |
| EP | 1221464 | A1 | * | 7/2002 | C08L 23/10 |
| EP | 1235232 | A1 | * | 8/2002 | H01B 3/441 |
| EP | 2151830 | A1 | * | 2/2010 | B82Y 10/00 |
| EP | 3067372 | A1 | * | 9/2016 | C08F 210/06 |
| ES | 2311515 | T3 | * | 2/2009 | H01B 3/441 |
| JP | H05-120923 | A | | 5/1993 | |
| JP | H09235519 | A | * | 9/1997 | |
| JP | H11236485 | A | * | 8/1999 | |
| JP | 2001-135152 | A | | 5/2001 | |
| JP | 2002-237219 | A | | 8/2002 | |
| JP | 2004148839 | A | * | 5/2004 | |
| JP | 2008-270119 | A | | 11/2008 | |
| KR | 20060115989 | A | * | 11/2006 | |
| KR | 20170078609 | A | * | 7/2017 | |
| KR | 101820399 | B1 | * | 3/2018 | |
| WO | WO-0074945 | A1 | * | 12/2000 | B41M 5/52 |
| WO | WO-03088274 | A1 | * | 10/2003 | H01B 7/0233 |
| WO | WO-2009096461 | A1 | * | 8/2009 | H01B 7/0275 |
| WO | WO-2010115173 | A1 | * | 10/2010 | C01B 31/04 |
| WO | WO-2011078865 | A1 | * | 6/2011 | H01B 7/2813 |
| WO | WO-2013029028 | A2 | * | 2/2013 | G06F 3/041 |
| WO | WO-2013047699 | A1 | * | 4/2013 | B32B 7/02 |
| WO | WO-2014199806 | A1 | * | 12/2014 | C08K 3/36 |
| WO | WO-2016096248 | A1 | * | 6/2016 | H01B 7/0216 |
| WO | WO-2017169795 | A1 | * | 10/2017 | H01B 13/012 |
| WO | WO-2018235368 | A1 | * | 12/2018 | H01B 3/30 |
| WO | WO-2019172018 | A1 | * | 9/2019 | B60R 16/0215 |
| WO | WO-2019188513 | A1 | * | 10/2019 | B60R 16/0215 |

* cited by examiner

INSULATED WIRE WITH BONDING LAYER OF POLYOLEFIN AND POLYAMIDE

CROSS REFERENCE TO RELATED APPLICATIONS

This application is a national phase of PCT application No. PCT/JP2019/051051, filed on 26 Dec. 2019, which claims priority from Japanese patent application No. 2019-004841, filed on 16 Jan. 2019, all of which are incorporated herein by reference.

TECHNICAL FIELD

The present disclosure relates to an insulated wire with bonding layer, and more specifically to an insulated wire with bonding layer having a bonding layer with thermal bonding properties on the outer side of an insulating coating that covers a conductor.

BACKGROUND

Vehicles such as automobiles and electrical and electronic devices use a large number of insulated wires having a conductor and an insulating coating that covers the outer circumference of the conductor. In recent years, the number of insulated wires that are used has been increasing as automobiles and electrical and electronic devices become increasingly high performance. Conventionally, such insulated wires have been used by being fixed to the body of an automobile, the casing of a device, or the like, using fixing hardware such as clamps. However, due to the increasing number of insulated wires that are used, the space occupied by fixing hardware and the like is increasing, and space saving is sought.

To address the above problem, use of an insulated wire having a bonding layer consisting of a modified polyolefin resin on the outer circumference, such as disclosed in Patent Document 1, for example, makes it possible to fix the insulated wire directly to the body, casing, or the like via the bonding layer without using fixing hardware or the like, and is effective for space saving.

PRIOR ART DOCUMENT

Patent Document

Patent Document 1: JP 2002-237219A

SUMMARY OF THE INVENTION

Problem to be Solved

Conventionally, a polyvinyl chloride composition is often used as the material for the insulating coating that covers the outer circumference of the conductor. The bonding layer is provided on the outer side of the insulating coating layer of the insulated wire so as to contact the insulating coating layer, but there is a problem in that polyvinyl chloride, which is often used for the insulating coating, has a weak adhesive strength on the modified polyolefin resin constituting the bonding layer of Patent Document 1, and delamination tends to occur at the interface between the insulating coating layer and the bonding layer. If the interface between the insulating coating layer and the bonding layer delaminates when a load is applied to the wire, the load is concentrated on the bonding layer on the outer side, and the adhesive strength of the entire wire decreases.

In view of the above problems, an object of the present disclosure is to provide an insulated wire with bonding layer having excellent adhesive strength between an insulating coating layer and a bonding layer provided on the outer side of the insulating coating layer.

Means to Solve the Problem

According to an embodiment of the present disclosure, there is provided an insulated wire with bonding layer including: a conductor; an insulating coating layer that covers an outer circumference of the conductor; and a bonding layer that is provided on an outer side of the insulating coating layer and is bonded by heat, wherein the insulating coating layer contains polyvinyl chloride, and the bonding layer contains a modified polyolefin resin and a polyamide resin.

Effect of the Invention

According to the insulated wire with bonding layer of the present disclosure, the adhesive strength between the insulating coating layer and the bonding layer provided on the outer side thereof is excellent.

DETAILED DESCRIPTION TO EXECUTE THE INVENTION

Figure 1:
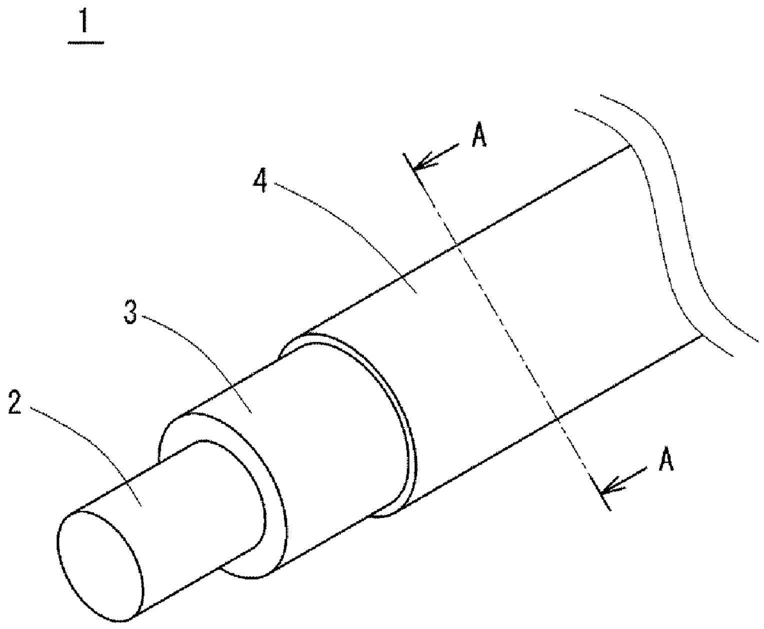
FIG. 1 is a perspective view showing an outward appearance of an insulated wire with bonding layer according to the present disclosure.

Modes of the present disclosure will initially be enumerated and described.

(1) An insulated wire with bonding layer of the present disclosure includes: a conductor; an insulating coating layer that covers an outer circumference of the conductor; and a bonding layer that is provided on an outer side of the insulating coating layer and is bonded by heat, wherein the insulating coating layer contains polyvinyl chloride, and the bonding layer contains a modified polyolefin resin and a polyamide resin.

According to the insulated wire with bonding layer of the present disclosure, because the insulated wire with bonding layer has a thermally bondable layer containing a modified polyolefin resin and a polyamide resin, the insulated wire with bonding layer contributes to space saving at the time of routing and has excellent adhesive strength between the insulating coating layer containing polyvinyl chloride and the bonding layer.

If the adhesive strength between the insulating coating layer and the bonding layer is insufficient, when a load is applied to the wire, delamination occurs at the interference between the insulating coating layer and the bonding layer, and the load concentrates on the bonding layer that is directly adhering to the adherend. Further, the bonding layer is stretched and broken at the thinned part, and the wire falls off from the adherend. In the wire with bonding layer according to the present disclosure, because the adhesive strength between the insulating coating layer and the bonding layer is excellent, a part of the bonding layer is not stretched, and a load is dispersed over the entire wire. Therefore, the wire is less likely to fall off.

(2) The polyamide resin is preferably a nylon-based hot-melt resin. This is because the polyamide resin has high crystallinity and excellent chemical resistance. In addition, because the nylon-based hot-melt resin is composed of a monomer having a short carbon chain as compared with other polyamide-based hot-melt resins, the density of amide bonds in the polyamide resin increases, and the adhesive strength between the insulating coating layer and the bonding layer is excellent.

(3) The bonding layer preferably contains at least 5 parts by mass of a polyamide resin with respect to 100 parts by mass of the polymer components. This is because the adhesive strength between the insulating coating layer and the bonding layer is excellent.

(4) The bonding layer is preferably provided on the outer side of the insulating coating layer over the entire circumference in the circumference direction. This is because the adhesion area between the bonding layer and the insulating coating layer increases. In addition, because the bonding layer has a ring shape in cross section, even if the bonding layer and the insulating coating are separated from each other, the wire does not immediately fall off and can be held.

(5) The insulated wire with bonding layer is preferably bonded via the bonding layer to a member containing a polyolefin resin. This is because when a member containing a polyolefin resin is used as the adherend, the adhesive strength is excellent.

Detailed Embodiments of Disclosure

Specific examples of an insulated wire with bonding layer of the present disclosure will be described below with reference to the drawings. Note that the disclosure is not limited to these illustrative examples.

An insulated wire 1 with bonding layer according to the present disclosure includes an insulated wire having a conductor 2 and an insulating coating layer 3 coating the outer circumference of the conductor 2, and further includes, on the outer side thereof, a bonding layer 4 containing a modified polyolefin resin and a polyamide resin. The bonding layer 4 is softened and bonded at a temperature lower than the heat resistance temperature of the insulating coating layer 3.

The modified polyolefin resin constituting the bonding layer 4 is a polyolefin into which functional groups have been introduced by copolymerizing or graft polymerizing a base polyolefin derived from α-olefin as a monomer with a polymerizable monomer having a functional group such as a carboxyl group, ester group, or acid anhydride group. Due to introducing these functional groups, the adhesive strength on the adherend 5 at the time of bonding is excellent. When the modified polyolefin resin has the acid anhydride group, the adhesive strength is particularly excellent. One type of modified polyolefin resin may also be used alone, or two or more types may also be used in combination.

The melting point of the modified polyolefin resin is preferably 185° C. or lower, and more preferably 160° C. or lower. When the melting point is 185° C. or lower, an increase in the softening point of the bonding layer 4 can be suppressed, and deterioration of the conductor 2 or the insulating coating layer 3 due to heat generated when bonding is performed is less likely to occur. On the other hand, the lower limit of the melting point, while not particularly limited, is preferably 80° C. or higher. When the melting point is 80° C. or higher, the bonding layer 4 readily stabilizes at the operating temperature of the insulated wire 1 with bonding layer. The melting point of the modified polyolefin resin is represented by the peak top temperature of the endothermic peak in "differential scanning calorimetry" (DSC).

The modified polyolefin resin constituting the bonding layer 4 preferably have a melt viscosity of about 40 to 4000 Pa·s at 160° C., for example. When the melt viscosity of the modified polyolefin resin is 40 Pa·s or more, the shape of the bonding layer 4 is easily stabilized, the extrusion moldability is excellent, and the shape of the bonding layer 4 hardly collapses due to heat during bonding. On the other hand, when the melt viscosity of the modified polyolefin resin is 4000 Pa·s or less, it is easy to secure a bonding surface on the adherend 5 at the time of bonding. The melt viscosity of the modified polyolefin resin is measured by a capillary rheometer.

The polyamide resin constituting the bonding layer 4 is not particularly limited, as long as the polyamide resin is a polymer bonded by an amide bond. A nylon-based resin or a dimer acid-based resin can be used, for example. The polyamide resin is preferably a nylon-based hot-melt resin. The nylon-based hot-melt resin is a random copolymer polyamide resin containing a saturated aliphatic monomer as a main constituent unit. The nylon-based hot-melt resin preferably has a structure of any of a lactam, an amino acid, a dicarboxylic acid, and a diamine, and preferably has a saturated aliphatic compound having about 6 to 12 carbon atoms as a monomer. Such a monomer is used as a main constituent unit, and a saturated aliphatic compound having more than 12 carbon atoms or an alicyclic or aromatic compound may also be added as a monomer. In the nylon-based hot-melt resin, characteristics such as crystallinity and softening point can be appropriately adjusted by combining a plurality of monomers having different carbon numbers or alicyclic or aromatic monomers.

In general, as the hot-melt resin having a polyamide structure, a hot-melt resin containing a dimer acid obtained by dimerization (or trimerization) of an unsaturated fatty acid and a diamine as main constituent units is often used. The dimer acid mainly uses linoleic acid, oleic acid, or the like as a raw material, has about 36 carbon atoms, and has a dicarboxylic acid structure having a branched chain and an unsaturated bond in the molecule. A polyamide resin having a dimer acid as a monomer has a complicated structure having many branch points and crosslinking points in the molecular structure, and the melting point tends to be low due to a decrease in crystallinity. On the other hand, a nylon-based hot-melt resin containing a saturated aliphatic monomer as a main constituent unit has a basic skeleton of a straight-chain structure and has high crystallinity. Thereby, excellent chemical resistance is obtained. In addition, by using a monomer having a relatively short carbon chain as compared with a dimer acid, the density of amide bonds increases, and the adhesive strength to an insulating coating layer or an adherend is excellent. In addition, because the nylon-based hot-melt resin exhibits colorless transparency or light-yellow color, it can be easily colored, and when the bonding layer 4 is provided on the outer circumference of the wire, it is excellent in identification and appearance.

The polyamide resin preferably has a melting point of 80 to 160° C. More preferably, the melting point is 85 to 150° C. When the melting point is 160° C. or lower, an increase in the softening point of the bonding layer 4 can be suppressed, and deterioration of the conductor 2 or the insulating coating layer 3 due to heat generated when bonding is performed is less likely to occur. On the other hand, when the melting point is 80° C. or higher, the bonding layer 4 readily stabilizes at the operating temperature of the insulated wire 1 with bonding layer. The melting point of the polyamide resin is represented by the peak top temperature of the endothermic peak in "differential scanning calorimetry" (DSC).

The polyamide resin constituting the bonding layer 4 preferably has a melt viscosity of about 40 to 4000 Pa·s at 160° C., for example. When the melt viscosity of the polyamide resin is 40 Pa·s or more, the shape of the bonding layer 4 is easily stabilized, the extrusion moldability is excellent, and the shape of the bonding layer 4 hardly collapses due to heat during bonding. On the other hand, when the melt viscosity of the polyamide resin is 4000 Pa·s or less, it is easy to secure a bonding surface on the adherend 5 at the time of bonding. The melt viscosity of the polyamide resin is measured by a capillary rheometer.

The content of the polyamide resin is preferably at least 5 parts by mass, more preferably at least 10 parts by mass, and further preferably at least 20 parts by mass, with respect to 100 parts by mass of the polymer components constituting the bonding layer 4. When the content of the polyamide resin is at least 5 parts by mass, the adhesive strength with the insulating coating layer 3 containing polyvinyl chloride is excellent. On the other hand, there is no particular upper limit to the content of the polyamide resin. In the case where the adherend 5 contains a polyolefin resin, for example, if the content of the polyamide resin in the bonding layer 4 is too high, the adhesive strength to the adherend 5 may decrease. From such a viewpoint, the content of the polyamide resin is preferably at most 70 parts by mass with respect to 100 parts by mass of the polymer components constituting the bonding layer 4.

The bonding layer 4 may also consist of a single layer, or may also be formed by laminating a plurality of layers. When formed from a plurality of layers, the adhesive strength between the insulating coating layer 3 and the bonding layer 4 is improved by disposing a layer containing a large amount of the polyamide resin as the inner layer close to the insulating coating layer 3, for example. At this time, the modified polyolefin resin and the polyamide resin may be contained in the entire bonding layer, and the content ratio is preferably as described above in the total of the entire bonding layer.

The bonding layer 4 may also contain other components apart from the modified polyolefin resin and the polyamide resin in a range that does not impair the object of the present disclosure. Examples of other components include additives such as an inorganic filler, plasticizer, stabilizer, pigment, and antioxidant. Also, the bonding layer 4 may also contain other polymer components apart from the modified polyolefin resin and the polyamide resin. In the case of containing other polymer components, it is preferable, from the viewpoint of ensuring the adhesive strength of the bonding layer 4 on the insulating coating layer 3 and the adherend 5, that the content of the other polymer components is at most 30 parts by mass with respect to 100 parts by mass of the total polymer components constituting the bonding layer 4.

Examples of the inorganic filler serving as an additive include silica, diatomaceous earth, glass beads, talc, clay, alumina, a metal oxide such as magnesium oxide, zinc oxide, antimony trioxide or molybdenum oxide, a metal hydroxide such as magnesium hydroxide, a metal carbonate such as calcium carbonate or magnesium carbonate, a metal borate such as zinc borate or barium metaborate, and hydrotalcite. These may also be used alone, or two or more thereof may also be used in combination.

The softening point of the bonding layer 4 is preferably at least lower than the softening point of the insulating coating layer 3. Specifically, the softening point thereof is preferably 80 to 160° C. When the softening point is 160° C. or lower, deterioration of the conductor 2 or the insulating coating layer 3 and deformation of the insulating coating layer 3 due to heat when bonding the bonding layer 4 are less likely to occur. On the other hand, when the softening point is 80° C. or higher, the bonding layer 4 readily stabilizes at the operating temperature of the insulated wire 1 with bonding layer. The softening point of the bonding layer 4 and the softening point of the insulating coating layer 3 are represented by the peak top temperature of the endothermic peak in "differential scanning calorimetry" (DSC).

A regular insulated wire that is conventionally in common usage can be used for the insulated wire that is located on the inner side of the bonding layer 4. Specifically, an insulated wire having a conductor 2 and an insulating coating layer 3 covering the outer circumference of the conductor 2 may be used.

Copper is commonly used for the conductor 2, but a metal material such as aluminum or magnesium can also be used apart from copper. These metal materials may also be alloys. Examples of other metal materials for forming an alloy include iron, nickel, magnesium, silicon, and a combination thereof. The conductor 2 may also be constituted by a single wire, or may also be constituted by a twisted wire obtained by twisting a plurality of wire strands together.

Illustrative examples of the material constituting the insulating coating layer 3 include polyvinyl chloride, rubber, and polyolefin. These may also be used alone, or two or more thereof may also be combined for use. Also, various additives may also be added to these materials as appropriate.

Generally, the insulating coating is often constituted to include polyvinyl chloride. However, the adhesive strength between polyvinyl chloride and the modified polyolefin resin that is included in the bonding layer 4 is weak, and, in a conventional bonding layer, delamination tended to occur at the interface between the bonding layer and the insulating coating layer. In the present disclosure, due to the bonding layer 4 containing a modified polyolefin resin and a polyamide resin, the bonding layer 4 and the insulating coating layer 3 have an excellent adhesive strength, even when the insulating coating layer 3 contains polyvinyl chloride.

The respective materials constituting the insulating coating layer 3 and the bonding layer 4 can be heated and kneaded and the layers can be formed using an extrusion molding machine, for example. That is, the insulated wire is produced by combining the resin constituting the insulating coating layer 3 and various additive components that are added as necessary, and extruding the heated and kneaded composition around the conductor 2 with an extrusion molding machine to form the insulating coating layer 3. Thereafter, the insulated wire 1 with bonding layer can be produced by combining a modified polyolefin resin and a polyamide resin and various additive components that are added as necessary, and extruding the heated and kneaded composition on the outer side of the insulated wire with an extrusion molding machine to form the bonding layer 4.

Figure 2:
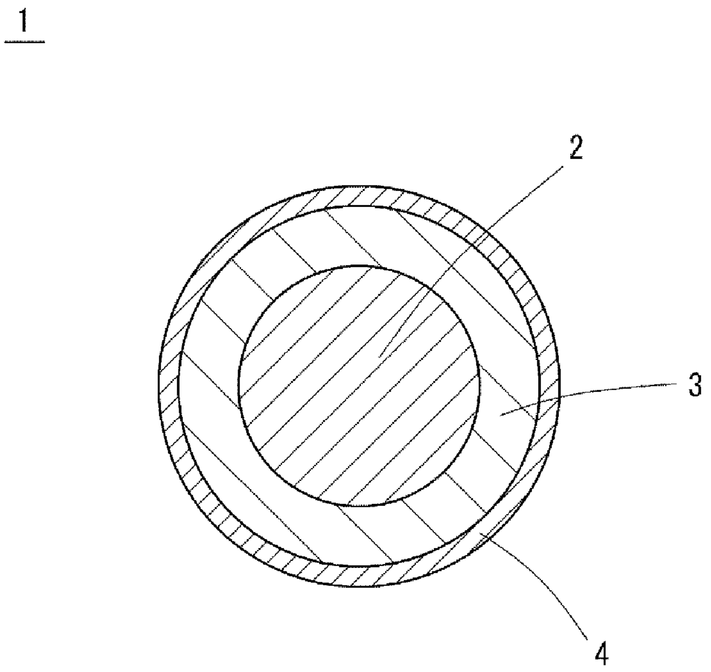
FIG. 2 is a sectional view taken along A-A in FIG. 1.

The bonding layer 4 may also be formed around the entire circumference in the circumferential direction on the outer side of the insulating coating layer 3 so as to be circular in cross-section, as shown in FIGS. 1 and 2, or may also be formed only partially in the circumference direction on the outer side of the insulating coating layer 3. When the bonding layer 4 is formed around the entire circumference on the outer side of the insulating coating layer 3, the adhesive area between the bonding layer 4 and the insulating coating layer 3 increases, and the adhesive strength is excellent. Also, in the case where the bonding layer 4 is circularly formed, even supposing that the bonding layer 4 and the insulating coating layer 3 delaminate, the wire can be retained if within the range of the tensile strength of the bonding layer 4, without the wire immediately becoming detached. Also, the bonding layer 4 does not need to be formed over the entire area in the length direction of the insulated wire.

The thickness of the conductor 2 and the thickness of the insulating coating layer 3 may be in the range of insulated wires that are normally used. On the other hand, the thickness of the bonding layer 4 is preferably from 0.03 to 0.12 mm. At 0.03 mm or more, sufficient bonding surface is readily secured, and at 0.12 mm or less, the thickness of the insulated wire 1 with bonding layer as a whole can be prevented from increasing excessively.

Figure 3:
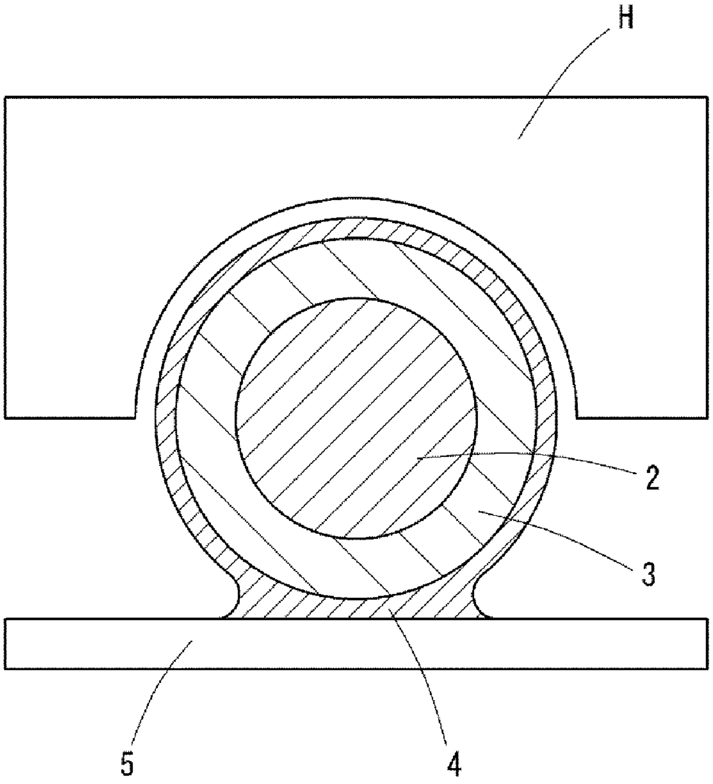
FIG. 3 is a sectional view in which the insulated wire with bonding layer according to the present disclosure is bonded to an adherend.

In the insulated wire 1 with bonding layer, the bonding layer 4 can be softened and bonded by being heated. The method of heating is not particularly limited, and examples thereof include generating frictional heat between the bonding layer 4 and the adherend 5 using an ultrasonic generator such as a horn H, as shown in FIG. 3, apart from directly heating the insulated wire 1 with bonding layer or the adherend 5. When heating with an ultrasonic generator, the bonding point can be heated locally, without excessively increasing the temperature of the entire insulated wire 1 with bonding layer, thus suppressing deterioration of the conductor 2 or the insulating coating layer 3 due to heat.

At this time, the insulating coating layer 3 and the bonding layer 4 are provided separately, and, by heating at a temperature not less than the softening point of the bonding layer 4 and not more than the softening point of the insulating coating layer 3, deformation of the insulating coating layer 3 at the time of bonding can be suppressed, and the insulated wire 1 with bonding layer can be bonded without compromising performance as an insulated wire.

The adherend 5 to which the insulated wire 1 with bonding layer is bonded is not particularly limited, and examples thereof include a member made of a resin such as polyolefin or polyester and a member made of a metal such as iron, aluminum, or stainless steel. Members made of a polyolefin resin are often used in vehicles such as automobiles, and given that the insulated wire 1 with bonding layer according to the present disclosure contains a modified polyolefin resin in the bonding layer 4, the adhesive strength on polyolefin resin members is particularly excellent.

Figure 4:
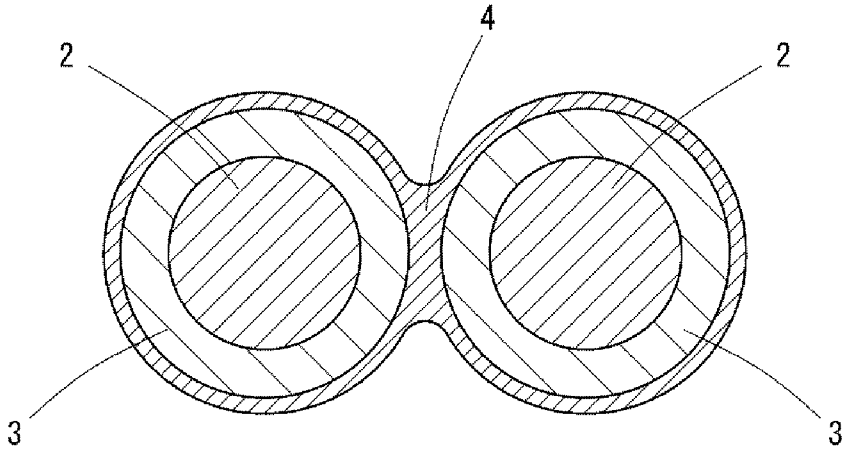
FIG. 4 is a sectional view in which two insulated wires with bonding layer according to the present disclosure are bundled and bonded.

The insulated wire 1 with bonding layer according to the present disclosure is also effective when a plurality of insulated wires 1 with bonding layer are used in a state of being bundled together through bonding, as shown in FIG. 4, apart from the purpose of fixing wires to the body of automobiles, the casing of devices or the like.

While an embodiment of the present disclosure has been described above in detail, the present disclosure is not in any way limited to the above embodiment, and various modifications can be made without departing from the gist of the disclosure.

Examples

Hereinafter, the present disclosure will be described in detail using illustrative examples, but the present disclosure is not limited by the working examples.

(Samples 1 to 5)

(Preparation of Bonding Layer Composition)

Acid-modified polyolefin ("TOYOTAC M-312", manufactured by Toyobo Co., Ltd.) and nylon-based hot-melt resins ("Platamid M1276", manufactured by Arkema) were blended in the proportions (parts by mass) shown in Table 1, and the blend was kneaded using a twin-screw extruder to prepare a composition for a bonding layer.

(Production of Insulated Wire)

100 parts by mass of polyvinyl chloride ("TK-1300" manufactured by Shin-Etsu Chemical Co., Ltd.), 2 parts by mass of an impact modifier ("Metablen C-223A" manufactured by Mitsubishi Chemical Corporation), 5 parts by mass of a stabilizer ("Adekastab RUP-110" manufactured by Adeka Corporation), 5 parts by mass of calcium carbonate ("Super #1700" manufactured by Maruo Calcium), and 32 parts by mass of a plasticizer ("Trimex N-08" manufactured by Kao Corporation) were kneaded using a twin-screw extruder, and then extruded around the stranded conductor having a conductor cross section of 0.13 $mm^2$ with a coating thickness of 0.2 mm to produce an insulated wire.

(Formation of Bonding Layer)

The prepared bonding layer composition was extruded at 200° C. on the entire outer circumference of the insulated wire to form a bonding layer having a thickness of 0.1 mm.

(Sample 11)

Sample 11 was the same as samples 1 to 5 except that the bonding layer was formed using only the modified polypropylene without using the polyamide resin.

(Evaluation)

Figure 5A:
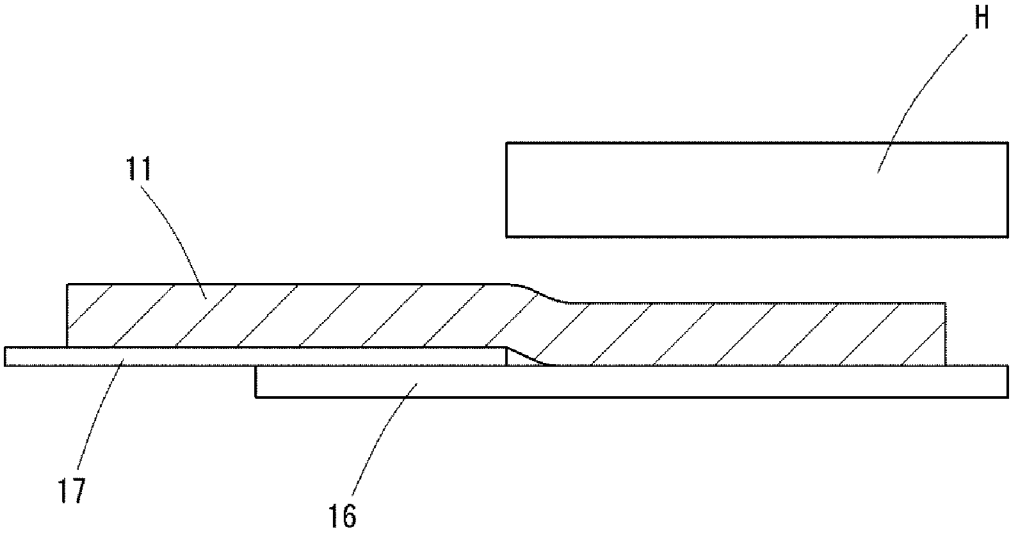
FIGS. 5A and 5B are diagrams showing a method of evaluating the adhesive strength of the wire with bonding layer, with 5A showing a method of bonding a wire with bonding layer to an adherend, and 5B showing a method of a peeling test of the wire with bonding layer.
Figure 5B:
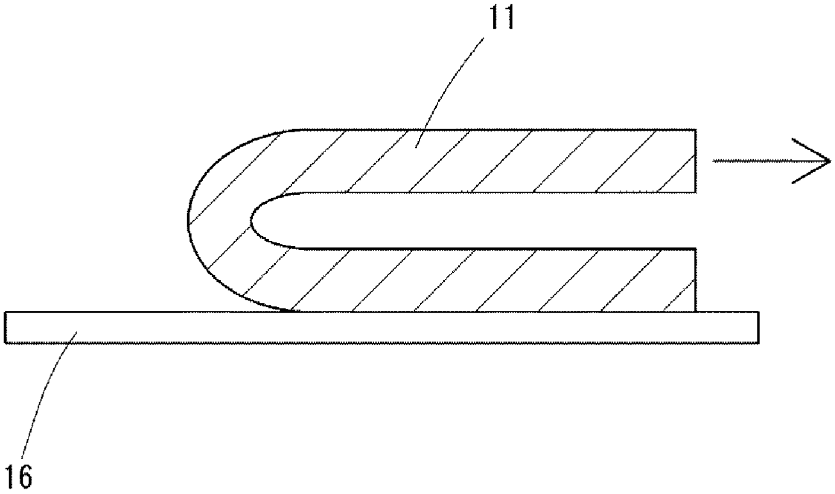

As shown in FIG. 5A, an insulated wire 11 with bonding layer was placed on a polypropylene plate 16 so as to come in contact 2 cm from the end portion, and the remaining portion thereof was protected with a release sheet 17, after which irradiation with 28 kHz ultrasound was performed from above by the horn H for about 1 second and the amount of the 50 J was given to bond the insulated wire 11 with the bonding layer and the polypropylene plate 16. Thereafter, as shown in FIG. 5B, the portion protected by the release sheet was folded back 180 degrees in the direction of bonded end portion, and pulled in the axial direction to peel off the insulated wire 11 with bonding layer.

Regarding the interface between the bonding layer and the insulating coating layer, with respect to the length in the axial direction of the bonding, "A" indicates that peeling at the interface was 10% or less, "B" indicates that peeling at the interface was 30% or less, "C" indicates that peeling at the interface was 50% or less, and "F" (failure) indicates that peeling at the interface was more than 50%.

TABLE 1

| | Sample 1 | Sample 2 | Sample 3 | Sample 4 | Sample 5 | Sample 11 |
|---|---|---|---|---|---|---|
| Modified PP | 5 | 20 | 50 | 80 | 95 | 100 |
| Polyamide | 95 | 80 | 50 | 20 | 5 | |
| Surface state | A | A | A | B | B | F |

Sample 11 containing no polyamide resin in the bonding layer had poor adhesive strength to the insulating coating layer. On the other hand, samples 1 to 5 containing a polyamide resin in the bonding layer exhibited excellent adhesive strength to the insulating coating layer. The adhesive strength to the polypropylene plate tended to be more excellent as the amount of the polyamide resin was smaller. Samples 1 and 2 exhibited high adhesive strength to the insulating coating layer, but tended to have slightly inferior adhesive strength to the polypropylene plate. In samples 3 to 5, excellent adhesive strength was exhibited to both of the insulating coating layer and the polypropylene plate, and cohesive failure in which the bonding layer itself was broken was often observed.

DESCRIPTION OF SYMBOLS

1 Insulated wire with bonding layer
2 Conductor
3 Insulating coating layer
4 Bonding layer
5 Adherend
11 Insulated wire with bonding layer
16 Polypropylene plate
17 Release sheet
H Horn (ultrasonic generator)

What is claimed is:

1. An insulated wire with bonding layer comprising:

a conductor;

an insulating coating layer that covers an outer circumference of the conductor; and a bonding layer that is provided on an outer side of the insulating coating layer and is bonded by heat, wherein the insulating coating layer contains polyvinyl chloride, the bonding layer contains a modified polyolefin resin and a polyamide resin, and does not contain a polymer component apart from the modified polyolefin resin and the polyamide resin or contains only at most 30 parts by mass of the polymer component apart from the modified polyolefin resin and the polyamide resin with respect to 100 parts by mass of the total polymer components, the modified polyolefin resin is obtained by introducing an ester group into a base polyolefin, the polyamide resin is a nylon-based hot-melt resin, and the nylon-based hot-melt resin has a structure of one of an amino acid, a dicarboxylic acid, and a diamine, and has a saturated aliphatic compound having 6 to 11 carbon atoms as a monomer.

2. The insulated wire with bonding layer according to claim 1, wherein the bonding layer contains at least 5 parts by mass of the polyamide resin with respect to 100 parts by mass of the polymer components.

3. The insulated wire with bonding layer according to claim 1, wherein the bonding layer is provided on the outer side of the insulating coating layer over the entire circumference in the circumference direction.

4. The insulated wire with bonding layer according to claim 1, wherein the insulated wire with bonding layer is bonded via the bonding layer to a member containing a polyolefin resin.

5. The insulated wire with bonding layer according to claim 1, wherein the bonding layer is an extrusion molded body having a thickness of 0.03 to 0.12 mm.

6. The insulated wire with bonding layer according to claim 1, wherein the content of the polyamide resin in the bonding layer is at most 70 parts by mass with respect to 100 parts by mass of the polymer components.

7. The insulated wire with bonding layer according to claim 1, wherein the base polyolefin of the modified polyolefin resin is a polyolefin derived from α-olefin as a monomer.

8. The insulated wire with bonding layer according to claim 7, wherein the base polyolefin of the modified polyolefin resin is polypropylene.

* * * * *